Patented May 12, 1925.

1,537,507

UNITED STATES PATENT OFFICE.

HAROLD W. STIEGLER, OF LAWRENCE, MASSACHUSETTS.

PRODUCTION OF VAT DYES.

No Drawing. Application filed November 6, 1920. Serial No. 422,185.

*To all whom it may concern:*

Be it known that I, HAROLD W. STIEGLER, a citizen of the United States of America, and a resident of Lawrence, Massachusetts, have invented new and useful Improvements in the Production of Vat Dyes, which invention is fully set forth in the following specification.

My invention relates to new anthraquinone dyes and the processes of preparing them. The dyes are prepared by heating amino derivatives of anthraquinone with nitrobenzene, in the presence of caustic alkali. The following examples illustrate the more general features of my invention and at the same time each example indicates the process of preparing a particular type of my anthraquinone dye as well as the dyes themselves.

*Example I: Preparation of a brown vat dye.*

5 parts by weight of 2-aminoanthraquinone are dissolved in 80 parts by weight of hot nitrobenzene and the temperature is raised to approximately 175° C. or, perhaps, 180° C. 15 parts by weight of powdered potassium hydroxid or the equivalent amount of other caustic alkali, for example, sodium, are then slowly added with stirring, the addition of this quantity of hydroxid consuming about half an hour. Potassium hydroxide is preferred. The temperature is maintained at 185°–190° C., violent seething taking place. This temperature should be maintained until the reaction subsides, care being taken that the temperature always remains below 190° C.

When the reaction is complete the mixture is filtered hot. The dye is then suitably purified as by extracting the solid residue several times with methyl alcohol to free the product from nitro benzene. The mass is then thoroughly extracted with boiling water to remove the water soluble material. This treatment leaves the dye contaminated with unchanged aminoanthraquinone. When dry the product is extracted with hot nitro benzene until free of the impurity. The nitro benzene is removed with methyl alcohol and the dye dried and ground. It is a very dark brown powder, insoluble in water, and in dilute acids and alkalies; it may, however, be treated with reducing agents to yield soluble compounds which are easily oxidized again to form the insoluble dye. I treat the dye with hydrosulfite and caustic soda solution, thereby transforming it into its hydro compound, the alkaline solution of which has the properties of a "vat" suitable for dyeing fast chocolate brown shades on cotton.

The reduction of the dye to the soluble form may be accomplished by dissolving about 5 parts by weight of caustic soda and about 2 parts by weight of hydrosulfite powder in a small amount of water, heating to 60° C., adding about 1 part by weight of the dye powder and maintaining the temperature at 60° C. until the color is all reduced. Then about 400 parts by weight of water at 60° are added, whereupon the "vat" is ready for receiving textiles to be dyed.

The "vat" is a clear, dark, golden brown which oxidizes to a bluer shade of brown.

It can be purified or concentrated, if necessary, by reducing and subsequently oxidizing with air, and filtering. Grape sugar in alkaline solution (NaOH), hydrosulfite in alkaline solution, as set forth above, or other alkaline reducing agents may be used for the reduction, which makes the dye soluble; and air may be blown through the solution to cause re-oxidation to the insoluble condition. The dye is insoluble in hot nitrobenzene and dissolves in concentrated sulfuric acid with an olive brown color.

*Example II: Production of other shades.*

5 parts by weight of alpha-diaminoanthraquinone (1–5 or 1–8) are dissolved in 100 parts by weight of nitrobenzene at a temperature of 175 to 180° C. and 15 parts of powdered potassium hydroxid, or the equivalent amount of sodium hydroxide or other caustic alkali, are slowly added during the course of half an hour with rapid stirring, keeping the temperature at about 185° C. until the reaction is complete, as described under Example I. The resulting dye is filtered off hot and purified of unchanged diaminoanthraquinone and other impurities, as stated under Example I. It is insoluble in hot nitrobenzene and dissolves in concentrated sulfuric acid with a brown color. It is insoluble, and may be treated with alkaline reducing agents to convert it into its soluble form, which is again easily oxidized to form the insoluble dye which is a yellowish shade of brown. Instead of the alpha-diaminoanthraquinone an equivalent weight of 1-aminoanthraquinone may be used, whereupon a blue color results.

Various other dyes are produced by using other amino derivatives of anthraquinone, or homologs and substitution products, all of which are intended to be included in the expression "amino derivative of anthraquinone", as used in the claims.

What I claim is:—

1. The process of producing anthraquinone vat dyes which consists in reacting on an amino derivative of anthraquinone with nitrobenzene in the presence of caustic alkali at a temperature of about 185° C.

2. The process of producing anthraquinone vat dyes which consists in reacting on 2-aminoanthraquinone with nitro benzene in the presence of caustic alkali at a temperature of about 185° C.

3. The process which comprises dissolving 5 parts of 2-aminoanthraquinone in 80 parts of hot nitrobenzene, raising the temperature thereof to approximately 175° C., slowly mixing therewith 15 parts of comminuted caustic alkali, maintaining the temperature at about 185° C. but below 190° C., and purifying the product.

In testimony whereof I have signed this specification.

HAROLD W. STIEGLER.